United States Patent
Seshadri et al.

(10) Patent No.: US 11,194,553 B2
(45) Date of Patent: Dec. 7, 2021

(54) IDENTIFYING AND RECOMMENDING CODE SNIPPETS TO BE REUSED BY SOFTWARE DEVELOPER

(71) Applicant: International Business Machines Corporation, Armonk, NY (US)

(72) Inventors: Padmanabha Venkatagiri Seshadri, Mysore (IN); Vijay Kumar Ananthapur Bache, Karnataka (IN); Bidhu Ranjan Sahoo, Bangalore (IN); Vijay Ekambaram, Chennai (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/573,911

(22) Filed: Sep. 17, 2019

(65) Prior Publication Data

US 2021/0081182 A1    Mar. 18, 2021

(51) Int. Cl.
| | |
|---|---|
| G06F 8/36 | (2018.01) |
| G06F 11/30 | (2006.01) |
| G06F 8/73 | (2018.01) |
| G06F 8/71 | (2018.01) |

(52) U.S. Cl.
CPC ............ *G06F 8/36* (2013.01); *G06F 8/71* (2013.01); *G06F 8/73* (2013.01); *G06F 11/302* (2013.01)

(58) Field of Classification Search
CPC ..... G06F 8/36; G06F 8/71; G06F 8/73; G06F 11/302
See application file for complete search history.

(56) References Cited

U.S. PATENT DOCUMENTS

| | | |
|---|---|---|
| 6,226,652 B1 | 5/2001 | Percival et al. |
| 7,290,251 B2 | 10/2007 | Livshits |
| 8,245,186 B2 | 8/2012 | Gryko et al. |
| 8,307,335 B2 | 11/2012 | Hutchison et al. |

(Continued)

OTHER PUBLICATIONS

Oyetoyan et al., "A Comparison of Different Defect Measures to Identify Defect-Prone Components", 2013, IEEE (Year: 2013).*

(Continued)

*Primary Examiner* — Wei Y Zhen
*Assistant Examiner* — Junchun N Wu
(74) *Attorney, Agent, or Firm* — Robert A. Voigt, Jr.; Winstead PC

(57) ABSTRACT

A computer-implemented method, system and computer program product for identifying and recommending code snippets to be reused by a software developer. Multiple sources (e.g., social media messages) are monitored for source code development difficulties. In response to detecting a source code development difficulty, the source code which is the source of the detected source code development difficulty is labeled with a struggle tag, which may indicate a category of the source code. Furthermore, source code snippets from various sources (e.g., source code snippets publicly available on the Internet) are mined, identified and labeled with tags, which may indicate a category of the source code snippet. Relevant source code snippets are identified to address the software developer's struggles based on matching one or more of these tags with the struggle tag, which are later ranked as to which are the best to address the software developer's struggles in writing source code.

17 Claims, 5 Drawing Sheets

(56) References Cited

U.S. PATENT DOCUMENTS

| | | | |
|---|---|---|---|
| 8,359,582 B2 | 1/2013 | Elliott | |
| 8,429,598 B2 | 4/2013 | Seitz et al. | |
| 8,589,859 B2 | 11/2013 | Kaulgud et al. | |
| 8,924,935 B1* | 12/2014 | Chopra | G06F 8/71 717/124 |
| 9,015,664 B2* | 4/2015 | Supplisson | G06F 8/71 717/121 |
| 9,043,753 B2* | 5/2015 | Fox | G06F 8/36 717/120 |
| 9,311,056 B2 | 4/2016 | Armstrong et al. | |
| 10,237,304 B1 | 3/2019 | Sokolov et al. | |
| 10,261,759 B2 | 4/2019 | Ng et al. | |
| 10,521,235 B1* | 12/2019 | Balasubramanian | G06F 9/5005 |
| 2004/0260940 A1* | 12/2004 | Berg | G06F 21/577 726/25 |
| 2005/0223354 A1* | 10/2005 | Drissi | G06F 8/36 717/114 |
| 2007/0250810 A1* | 10/2007 | Tittizer | G06F 8/73 717/110 |
| 2010/0095277 A1* | 4/2010 | Cheng | G06F 8/71 717/127 |
| 2011/0246968 A1* | 10/2011 | Zhang | G06F 8/751 717/125 |
| 2011/0252394 A1* | 10/2011 | Sharma | G06F 11/3616 717/101 |
| 2013/0074036 A1* | 3/2013 | Brandt | G06F 8/33 717/113 |
| 2013/0167120 A1* | 6/2013 | Amano | G06F 8/71 717/122 |
| 2013/0262419 A1 | 10/2013 | Kilian et al. | |
| 2014/0013299 A1 | 1/2014 | Bordeaux et al. | |
| 2014/0173555 A1* | 6/2014 | Ng | G06F 8/34 717/109 |
| 2014/0173561 A1* | 6/2014 | Toub | G06F 8/73 717/123 |
| 2014/0330899 A1 | 11/2014 | Franco et al. | |
| 2015/0007118 A1 | 1/2015 | McConville et al. | |
| 2015/0378692 A1* | 12/2015 | Dang | G06F 8/33 717/106 |
| 2017/0308376 A1* | 10/2017 | Barsness | G06F 8/443 |
| 2017/0316213 A1 | 11/2017 | McClintock et al. | |
| 2017/0329582 A1* | 11/2017 | Steven | G06F 8/33 |
| 2018/0024816 A1* | 1/2018 | Au | G06F 8/33 717/108 |
| 2019/0050319 A1* | 2/2019 | Gondalia | G06F 11/3664 |
| 2019/0287029 A1* | 9/2019 | Sobran | G06N 20/00 |
| 2019/0317760 A1* | 10/2019 | Kessentini | G06F 8/72 |
| 2019/0391792 A1* | 12/2019 | Sabharwal | G06N 3/0445 |
| 2020/0104235 A1* | 4/2020 | Mathur | G06F 8/75 |

OTHER PUBLICATIONS

Zhang et al., "A Novel Developer Ranking Algorithm for Automatic Bug Triage Using Topic Model and Developer Relations", 2014, IEEE (Year: 2014).*

Trewin et al., "Accessibility Challenges and Tool Features: An IBM Web Developer Perspective", 2010, ACM (Year: 2010).*

Zhang et al., "Bing Developer Assistant: Improving Developer Productivity by Recommending Sample Code", Nov. 2016, ACM (Year: 2016).*

Storey et al., "How Software Developers Use Tagging to Support Reminding and Refinding", 2009, IEEE, vol. 35, No. 4 (Year: 2009).*

Bortis et al., "PorchLight: A Tag-Based Approach to Bug Triaging", 2013, IEEE (Year: 2013).*

Zagalsky et al., "Example Overflow: Using Social Media for Code Recommendation," Proceedings of the Third International Workshop on Recommendation Systems for Software Engineering, 2012, pp. 38-42.

Maki et al., "Context Extraction in Recommendation Systems in Software Engineering: A Preliminary Study," Proceedings of the 25th Annual International Conference on Computer Science and Software Engineering, Nov. 2-4, 2015, pp. 151-160.

Sanchez et al., "Source Code Curation on StackOverflow: The Vesperin System," 37th IEEE International Conference on Software Engineering, Florence, Italy, 2015, pp. 661-664.

Sidiroglou-Douskos et al., "Automatic Error Elimination by Horizontal Code Transfer Across Multiple Applications," PLDI'15, Portland, Oregon, USA, Jun. 13-17, 2015, pp. 43-54.

Munson et al., "Analyzing Novice Programmers' Response to Compiler Error Messages," Journal of Computing Sciences in Colleges, vol. 31, Issue 3, Jan. 2016, pp. 53-61.

Barr et al., "Automated Software Transplantation," ISSTA'15, Baltimore, Maryland, USA, Jul. 12-17, 2015, pp. 257-269.

Long et al., "An Analysis of the Search Spaces for Generate and Validate Patch Generation Systems," ICSE'16, Austin, Texas, U.S. A., May 14-22, 2016, pp. 1-12.

* cited by examiner

IDENTIFYING AND RECOMMENDING CODE SNIPPETS TO BE REUSED BY SOFTWARE DEVELOPER

TECHNICAL FIELD

The present invention relates generally to software development, and more particularly to identifying and recommending code snippets to be reused by the software developer.

BACKGROUND

Within an organization, software developers store source code in source code repositories, which may include source code developed for multiple projects, including various versions of the same project. For example, a client may be serviced by more than one project. Other times, software developers develop multiple versions of the same project in parallel to address the requirements of different clients. As a result of having multiple source code projects for a single client and having multiple versions of the same source code project to be utilized by multiple clients, there are instances in which source code snippets could have been reused.

In addition to instances of source code snippets that could have been reused within an organization, there is a huge availability of source code snippets on the web, such as in web forums.

Building and creating software and applications by a software developer is a challenging task. At times, the software developer may struggle in writing such source code for the software and applications, where such struggles may be addressed by reusing relevant source code developed by another software developer.

SUMMARY

In one embodiment of the present invention, a computer-implemented method for identifying and recommending code snippets to be reused by a software developer comprises monitoring sources for source code development difficulties experienced by the software developer. The method further comprises detecting a source code development difficulty from the monitored sources for source code development difficulties. The method additionally comprises labeling source code which is a source of the detected source code development difficulty with a struggle tag indicating a category of source code. Furthermore, the method comprises storing the struggle tag in a repository. Additionally, the method comprises mining and identifying source code snippets from software-related documents, source code repositories, and source code snippets publicly available on the Internet. In addition, the method comprises labeling the identified source code snippets with tags that indicate a category of source code. The method further comprises storing the tags in the repository. The method additionally comprise identifying relevant source code snippets to address software developer's struggles based on matching one or more tags of the stored tags with the struggle tag. Furthermore, the method comprises ranking the identified relevant source code snippets to be reused by the software developer in terms of assisting the software developer. Additionally, the method comprises notifying the software developer of the ranked relevant source code snippets by providing a list of the ranked relevant source code snippets.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a computer-implemented method, system and computer program product for identifying and recommending code snippets to be reused by a software developer. In one embodiment of the present invention, multiple sources (e.g., source code management system, messages in collaborative applications, social media messages, physiological information, etc.) are monitored for source code development difficulties. In response to detecting a source code development difficulty, the source code which is the source of the detected source code development difficulty is labeled with a struggle tag, which may indicate a category of the source code. The struggle tag is later stored in a repository. In one embodiment, the source code associated with the detected source code development difficulty is identified via dependency analysis of the source code and work item artifacts. Furthermore, source code snippets from software-related documents, source code repositories, and source code snippets publicly available on the Internet are mined, identified and labeled with tags, which may indicate a category of the source code snippet. Such tags are stored in the repository. Relevant source code snippets are identified to address the software developer's struggles based on matching one or more tags of these stored tags with the struggle tag. The identified relevant source code snippets to be reused are ranked as to which are the best to be utilized by the software developer to address the software developer's struggles in writing source code. The software developer is then notified of the ranked relevant source code snippets. In this manner, relevant source code snippets are identified and recommended to be reused by the software developer to address the software developer's current challenges in coding.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
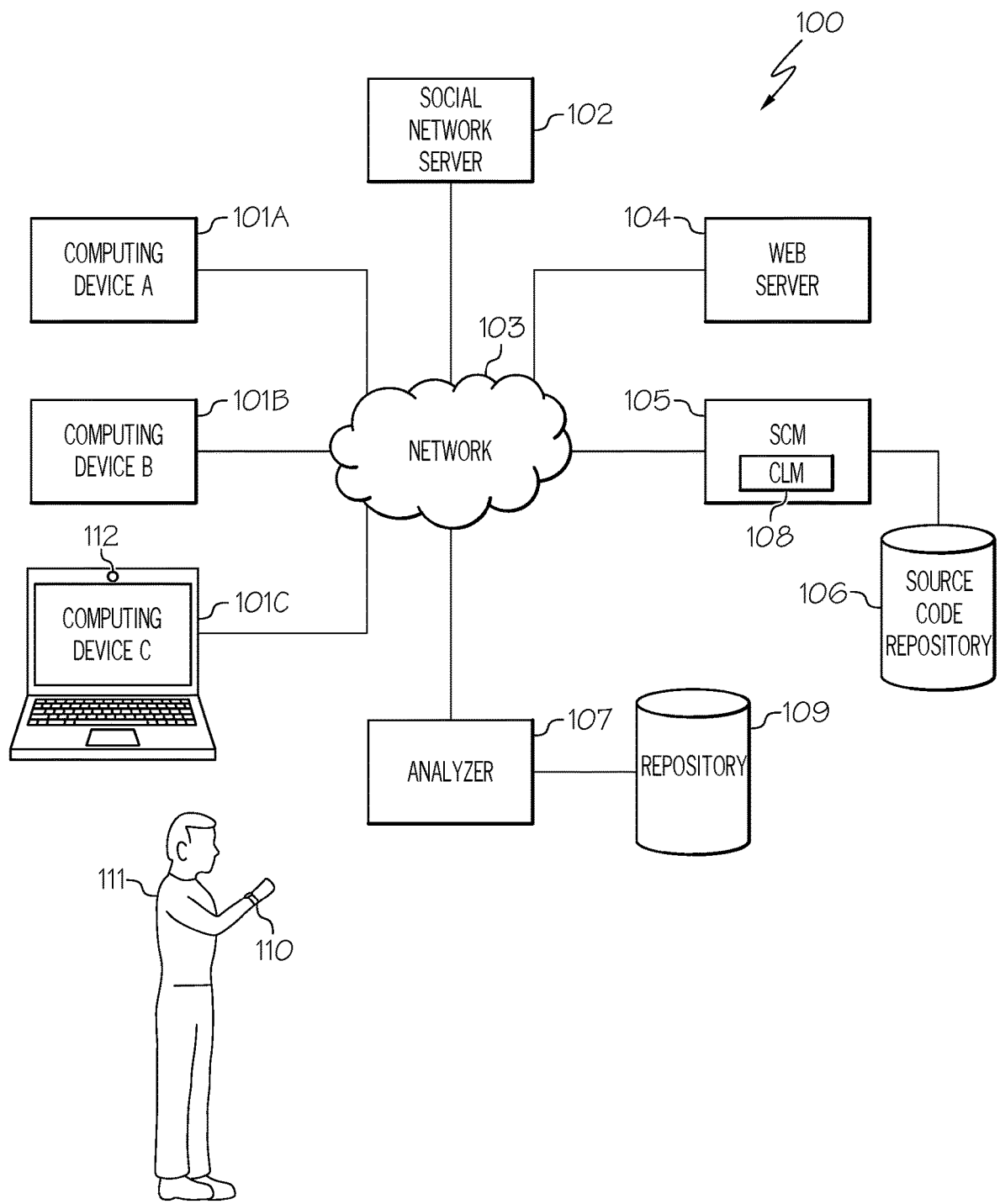
FIG. 1 illustrates a communication system for practicing the principles of the present invention in accordance with an embodiment of the present invention.

Referring now to the Figures in detail, FIG. 1 illustrates an embodiment of the present invention of a communication system 100 for practicing the principles of the present invention in accordance with an embodiment of the present invention. Communication system 100 includes computing devices 101A-101C (identified as "Computing Device A," "Computing Device B," and "Computing Device C," respectively, in FIG. 1) connected to a social network server 102 via a network 103. Computing devices 101A-101C may collectively or individually be referred to as computing devices 101 or computing device 101, respectively. It is noted that both computing devices 101 and the users of computing devices 101 may be identified with element number 101.

Computing device 101 may be any type of computing device (e.g., portable computing unit, Personal Digital Assistant (PDA), laptop computer, mobile device, tablet personal computer, smartphone, mobile phone, navigation device, gaming unit, desktop computer system, workstation, Internet appliance and the like) configured with the capability of connecting to network 103 and consequently communicating with other computing devices 101 and social network server 102.

Network 103 may be, for example, a local area network, a wide area network, a wireless wide area network, a circuit-switched telephone network, a Global System for Mobile Communications (GSM) network, a Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

Social network server 102, which may be a web server configured to offer a social networking and/or microblogging service, enables users of computing devices 101 to send and read other users' posts. "Posts," as used herein, include any one or more of the following: text (e.g., comments, sub-comments and replies), audio, video images, etc. Social network server 102, as used herein, is configured to enable various collaborative activities, such as online discussion sites (e.g., public forums). Social network server 102 is connected to network 103 by wire or wirelessly. While FIG. 1 illustrates a single social network server 102, it is noted for clarity that multiple servers may be used to implement the social networking and/or microblogging service.

System 100 further includes a web server 104 connected to computing devices 101 via network 103. Web server 104 is configured to host websites and serve contents to the World Wide Web. Furthermore, web server 104 is configured to process incoming network requests over HTTP (Hypertext Transfer Protocol) and several other related protocols.

In one embodiment, system 100 includes a source control management (SCM) system 105 connected to network 103, where SCM system 105 is configured to manage the repository of source code in repository 106. In one embodiment, source code repository 106 is a repository of source code written by software developers. In one embodiment, such a repository is stored within an organization. In another embodiment, such a repository is external to an organization and may be publicly available, such as via the Internet.

Furthermore, as shown in FIG. 1, system 100 includes a component, referred to herein as the "analyzer" 107 connected to network 103. In one embodiment, analyzer 107 is configured to identify and recommend appropriate code snippets to be reused by the software developer who is experiencing difficulty in writing the source code as discussed below in connection with FIGS. 3-5.

In connection with identifying and recommending appropriate code snippets to be reused by the software developer, analyzer 107 is configured to monitor multiple sources (e.g., source code management system 105, messages in collaborative applications (e.g., collaborative lifecycle management application), social media messages, physiological information obtained from smart wearables and web cameras, etc.) to detect source code development difficulties experienced by the software developer (e.g., user of computing device 101). Furthermore, analyzer 107 is configured to monitor multiple sources (e.g., software-related documents, software repositories, publicly available source code snippets on the Internet) for source code snippets to be reused, such as by the software developer experiencing struggles in writing source code, which are labeled and categorized. A description of an embodiment of a hardware configuration of analyzer 107 is provided below in connection with FIG. 2.

The following provides a brief description of some of the sources monitored by analyzer 107.

In one embodiment, analyzer 107 tracks the changes committed to the SCM system 105. For example, analyzer 107 tracks the commits, including the number of commits, inter-commit durations as well as analyzes the commit text via a sentiment analysis tool (e.g., TensiStrength to detect the strength of stress and relaxation expressed in the text) to determine the extent of the software developer's (e.g., user of computing device 101A) struggles in writing source code. "Sentiment analysis," as used herein, refers to the process of computationally identifying and categorizing opinions expressed in a piece of text, especially in order to determine whether the writer's attitude towards writing source code is positive, negative, or neutral.

Furthermore, in one embodiment, SCM 105 includes a collaborative lifecycle management (CLM) tool 108 configured to coordinate software development activities across business and system requirements, design, development, build, test, and delivery. Such activities are analyzed by analyzer 107 to identify the software developer's struggles in writing source code, including analyzing user stories (informal, natural language description of one or more features of a software system), text pertaining to CLM issues via a sentiment analysis tool (e.g., TensiStrength to detect the strength of stress and relaxation expressed in the text) and the CLM issue severity and resolution duration to determine the extent of the software e developer's (e.g., user of computing device 101A) struggles in writing source code.

Additionally, in one embodiment, a tag repository 109 is connected to analyzer 107 for storing tags that are directed to the types of difficulties being experienced by the software developer (e.g., user of computing device 101).

To assist analyzer 107 in detecting "struggles" or difficulties experienced by the software developer in writing source code, analyzer 107 receives physiological information (e.g., heart rate) from a smart wearable 110 worn (such as on the user's wrist) by a user 111, such as a software developer using computing device 101. In one embodiment, smart wearable 110 is connected to network 103 thereby allowing such physiological information to be provided to analyzer 107 via network 103. It is noted for clarity that user 111 may correspond to any user of computing device 101 and not limited to the user of computing device 101C.

In one embodiment, smart wearable 110 is configured to monitor the user's heart rate, the user's body temperature, levels of a user's sweat, etc. Such monitored information may be transmitted to analyzer 107, such as via network 103. Such monitored information is one of the means for monitoring the user's current heath state as well as for indicating "struggles" or difficulty in writing source code by user 111 (e.g., software developer). For example, a high heart rate may indicate frustration experienced by user 111 if the high heart rate is detected when user 111 is currently attempting to write source code.

Additionally, analyzer 107 receives other physiological information from a web camera 112, such as the web camera shown on computing device 101C. While FIG. 1 only illustrates computing device 101C as containing a web camera, it is noted that any computing device 101 may include such a web camera.

In one embodiment, web camera 112 is utilized to detect eye shrinks, facial expressions and emotions. In one embodiment, emotions determination (recognition process) is performed in 3 basic phases: face detection, facial features extraction, and expression classification utilizing Affectiva® Software Development Kits (SDKs). In one embodiment, web camera 112 captures images of various facial expressions of user 111, where facial landmarks on these images can be automatically detected using the SDK from Affectiva®. In one embodiment, the geometric feature based approach is used for feature extraction. The distance between landmarks is used as a feature, and for selecting an optimal set of features, the brute force method is used. In one embodiment, a neural network algorithm is used for classification. In one embodiment, analyzer 107 recognizes 7 facial expressions, namely anger, disgust, fear, happiness, sadness, surprise and neutral.

In one embodiment, such detected eye shrinks, facial expressions and emotions are used to determine whether user 111 is experiencing "struggles" or difficulty in writing source code. For example, if user 111 is expressing anger or disgust when user 111 is writing source code, then it may be inferred that user 111 is experiencing difficulty in writing source code at that moment, such as writing source code for a particular module of the source code. For instance, if user 111 expresses anger or disgust a threshold number of times over a threshold period of time, then it may be inferred that user 111 is experiencing difficulty in writing code for this particular section of the source code. In another example, if the user's period of inactivity exceeds a threshold period of time and the user's gaze at the screen exceeds a threshold period of time, then it may be inferred that user 111 is experiencing difficulty in writing code for this particular section of the source code.

In another embodiment, web camera 112 is utilized to capture facial images of user 111 to determine whether user 111 is experiencing difficulty in writing source code. Analyzer 107, receiving such information from web camera 112, utilizes facial expression from Selas (Esentepe M. Elçi S. No: 11/9 Kartal, Istanbul, Turkey) to measure and categorize emotions from these captured facial images, such as happiness, surprise, sadness, anger, fear, disgust and neutral. Also, expression intensity may be identified.

Other tools may be utilized by analyzer 107 to evaluate the captured facial images of user 111 to determine emotions, facial expressions, etc. which are used to determine whether user 111 is experiencing difficulty in writing source code. For example, Facelytics by Wassa and the platform by EyeSee may be utilized to determine emotions, facial expressions, etc. based on the captured facial images of user 111.

Additionally, analyzer 107 is configured to analyze social media messages using natural language processing for detecting struggles in writing source code, such as identifying keywords, such as "difficulty" and "trouble," next to snippets of source code. Such snippets may be labeled and tagged as corresponding to sources of struggles being experienced by the software developer.

System 100 is not to be limited in scope to any one particular network architecture. System 100 may include any number of computing devices 101, social network servers 102, networks 103, web servers 104, SCMs 105, source code repositories 106, analyzers 107, CLMs 108, repositories 109, smart wearables 110, users 111 and web cameras 112. Furthermore, while FIG. 1 illustrates analyzer 107 as being a separate physical device, some or all of the functionality of analyzer 107 may reside in computing device 101.

Figure 2:
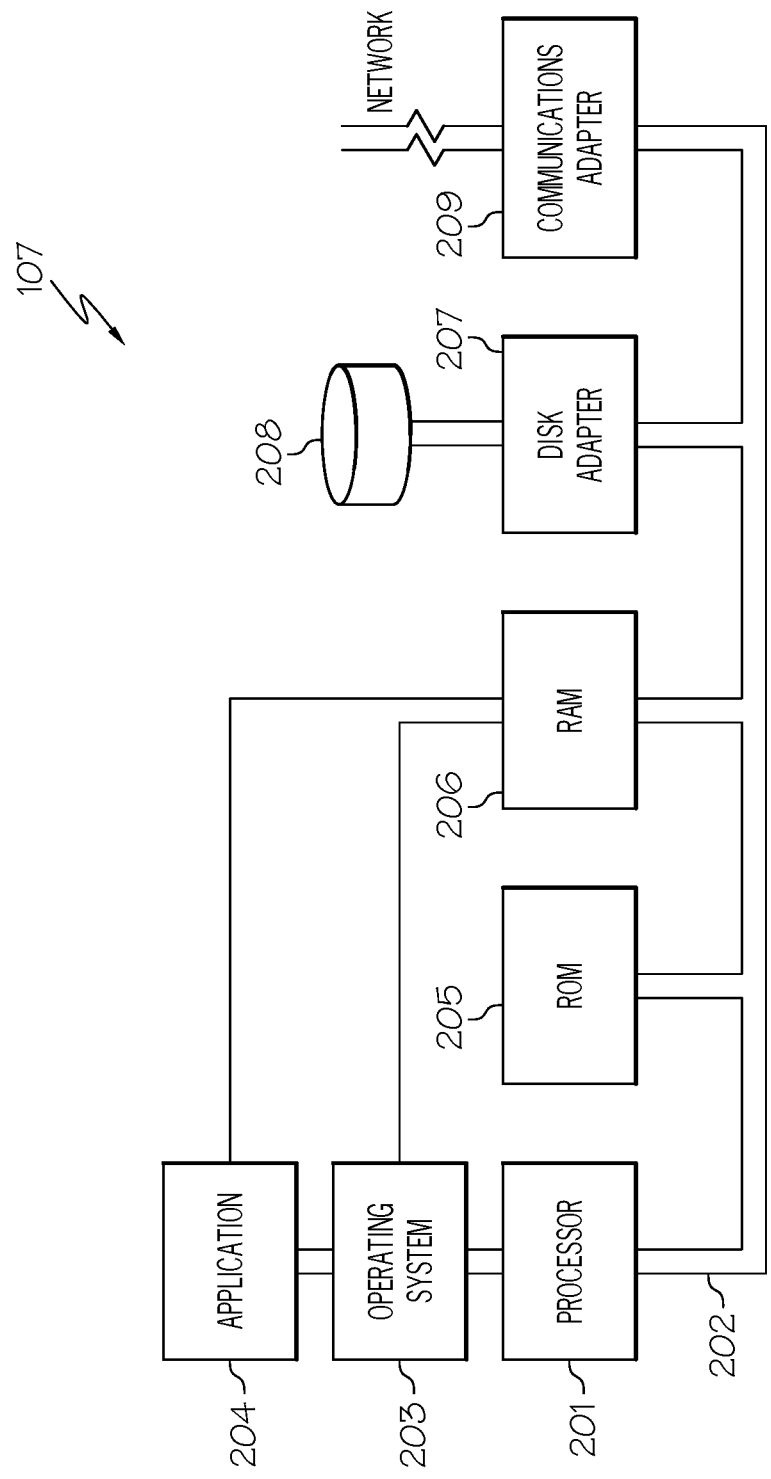
FIG. 2 illustrates an embodiment of the present invention of a hardware configuration of the analyzer which is representative of a hardware environment for practicing the present invention.

Referring now to FIG. 2, FIG. 2 illustrates a hardware configuration of analyzer 107 (FIG. 1) which is representative of a hardware environment for practicing the present invention. Referring to FIG. 2, analyzer 107 has a processor 201 connected to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, a program for identifying and recommending appropriate code snippets to be reused by the software developer who is experiencing difficulty in writing source code to address the software developer's current challenges in coding as discussed below in connection with FIGS. 3-5.

Referring again to FIG. 2, read-only memory ("ROM") 205 is connected to system bus 202 and includes a basic input/output system ("BIOS") that controls certain basic functions of analyzer 107. Random access memory ("RAM") 206 and disk adapter 207 are also connected to system bus 202. It should be noted that software components including operating system 203 and application 204 may be loaded into RAM 206, which may be analyzer's 107 main memory for execution. Disk adapter 207 may be an integrated drive electronics ("IDE") adapter that communicates with a disk unit 208, e.g., disk drive. It is noted that the program for identifying and recommending appropriate code snippets to be reused by the software developer who is experiencing difficulty in writing source code to address the software developer's current challenges in coding, as discussed below in connection with FIGS. 3-5, may reside in disk unit 208 or in application 204.

Analyzer 107 may further include a communications adapter 209 connected to bus 202. Communications adapter 209 interconnects bus 202 with an outside network (e.g., network 103 of FIG. 1) thereby allowing analyzer 107 to communicate with various devices, such as computing devices 101, social network servers 102, web servers 104, SCMs 105, smart wearables 110, web cameras 112, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, within an organization, software developers store source code in source code repositories, which may include source code developed for multiple projects, including various versions of the same project. For example, a client may be serviced by more than one project. Other times, software developers develop multiple versions of the same project in parallel to address the requirements of different clients. As a result of having multiple source code projects for a single client and having multiple versions of the same source code project to be utilized by multiple clients, there are instances in which source code snippets could have been reused. In addition to instances of source code snippets that could have been reused within an organization, there is a huge availability of source code snippets on the web, such as in web forums. Building and creating software and applications by a software developer is a challenging task. At times, the software developer may struggle in writing such source code for the software and applications, where such struggles may be addressed by reusing relevant source code developed by another software developer. However, despite the fact that there is a large availability of code snippets that could be reused as discussed above, there is not currently a means for discovering relevant reusable code snippets, whether within an organization or on the web, that could address the software developer's challenges in writing the source code.

Figure 3:
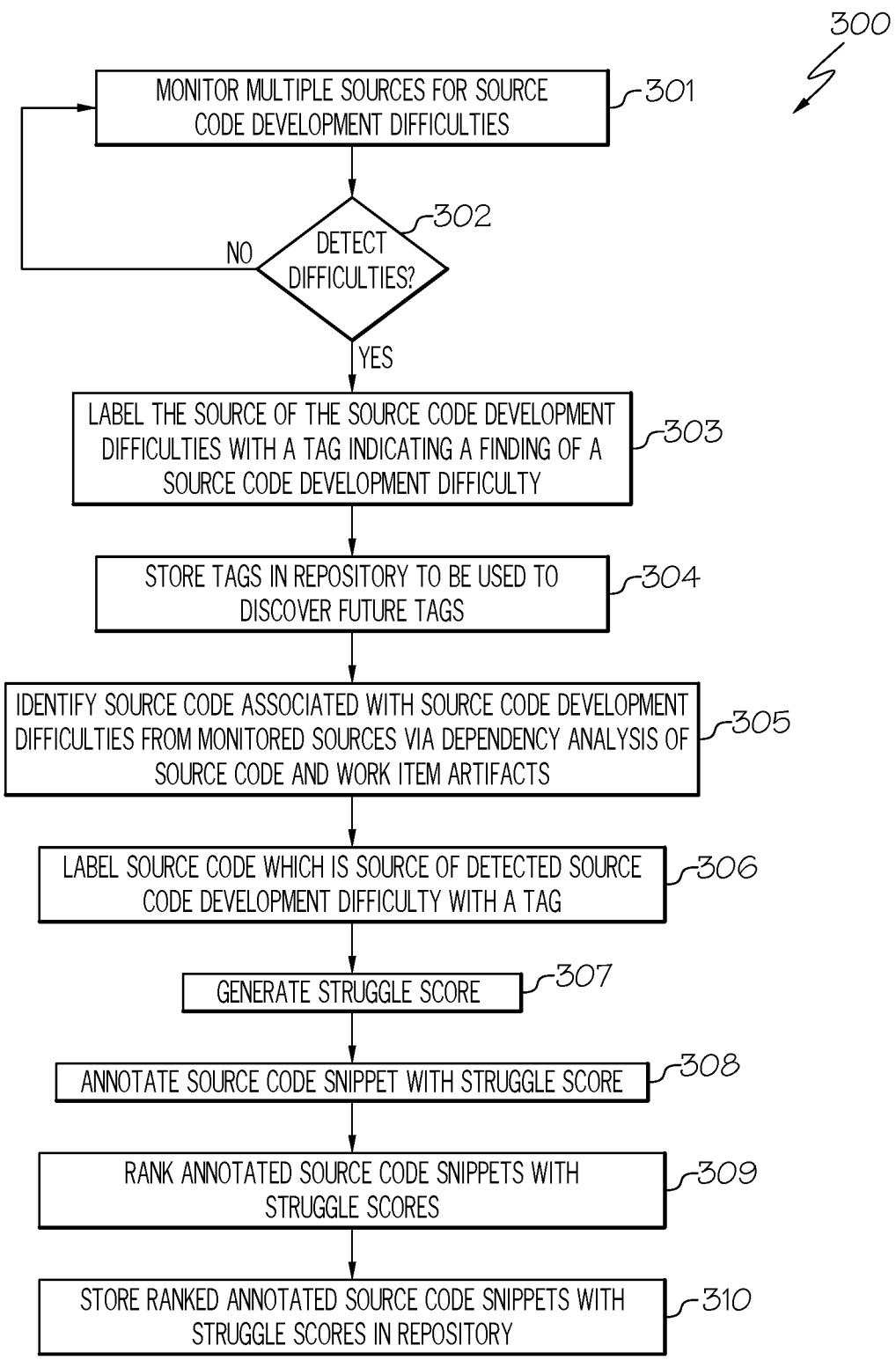
FIG. 3 is a flowchart of a method for identifying source code snippets associated with source code development difficulties in accordance with an embodiment of the present invention.
Figure 4:
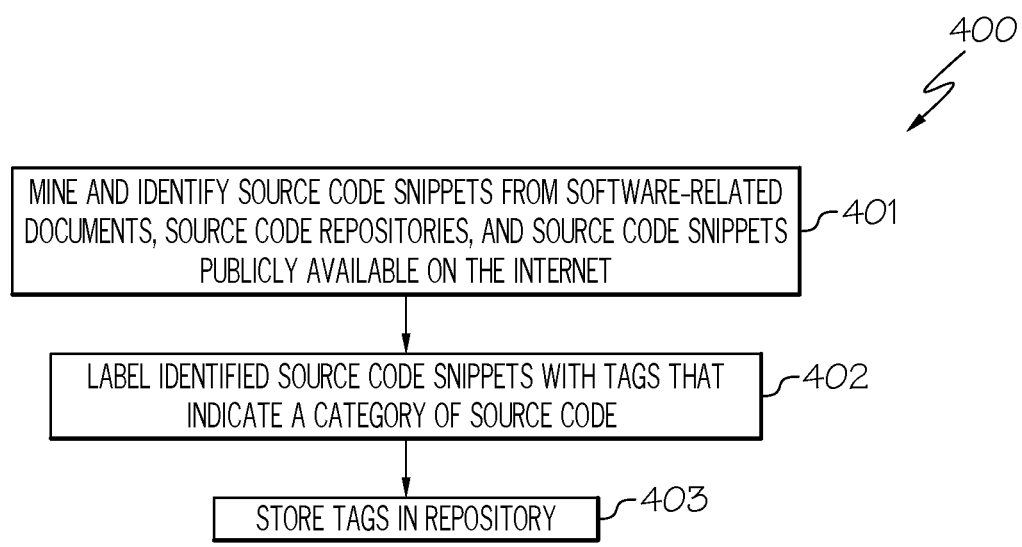
FIG. 4 is a flowchart of a method for populating a repository of tags associated with source code snippets available to be reused in accordance with an embodiment of the present invention.
Figure 5:
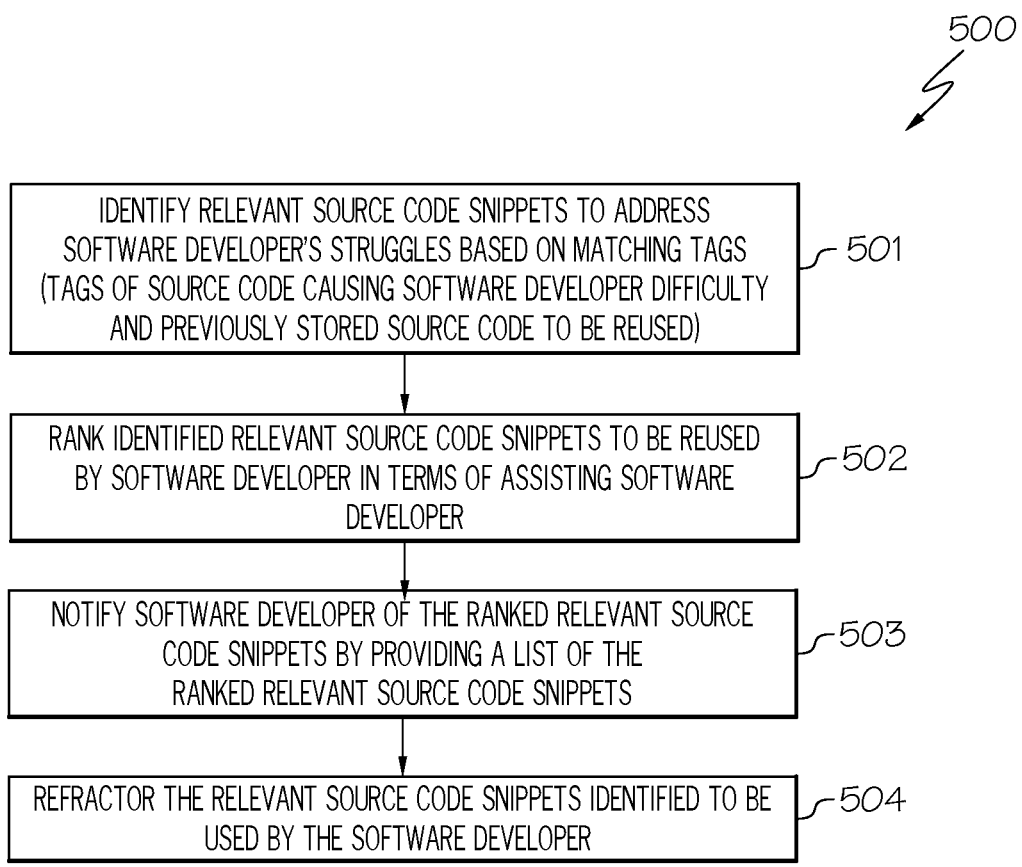
FIG. 5 is a flowchart of a method for providing the software developer a list of relevant source code snippets to be reused by the software developer to overcome the difficulties experienced by the software developer in accordance with an embodiment of the present invention.

The embodiments of the present invention provide a means for identifying and recommending code snippets to be reused by the software developer who is experiencing difficulty in writing source code to address the software developer's current challenges in coding as discussed below in connection with FIGS. 3-5. FIG. 3 is a flowchart of a method for identifying source code snippets associated with source code development difficulties. FIG. 4 is a flowchart of a method for populating a repository of tags associated with source code snippets available to be reused. FIG. 5 is a flowchart of a method for providing the software developer a list of relevant source code snippets to be reused by the software developer to overcome the difficulties experienced by the software developer.

As stated above, FIG. 3 is a flowchart of a method 300 for identifying source code snippets associated with source code development difficulties in accordance with an embodiment of the present invention.

Referring to FIG. 3, in conjunction with FIGS. 1-2, in step 301, analyzer 107 monitors multiple sources for source code development difficulties. As previously discussed, analyzer 107 monitors multiple sources (e.g., source code management system 105, messages in collaborative applications (e.g., collaborative lifecycle management application), social media messages, physiological information obtained from smart wearables and web cameras, etc.) to detect source code development difficulties.

In one embodiment, analyzer 107 utilizes natural language processing to identify keywords (e.g., "difficulty") in messages (e.g., social media messages, messages in collaborative applications) in connection with source code writing. For example, analyzer 107 may detect posting of source code online (e.g., detect keywords, such as "source code") and comments made in connection with such postings (e.g., "trouble"). Such comments may be scored based on how negative of a connotation is expressed in connection with writing the source code. In one embodiment, the higher the score, the higher the negative connotation is expressed. If the score exceeds a threshold value, then analyzer 107 may determine that the user is experiencing source code development difficulties in connection with the source code the user is currently creating.

In one embodiment, analyzer 107 tracks the number of commits, inter-commit durations as well as analyzes the commit text via a sentiment analysis tool (e.g., TensiStrength to detect the strength of stress and relaxation expressed in the text) to determine the extent of the software developer's (e.g., user of computing device 101A) struggles in writing source code. "Sentiment analysis," as used herein, refers to the process of computationally identifying and categorizing opinions expressed in a piece of text, especially in order to determine whether the writer's attitude towards writing source code is positive, negative, or neutral. For example, analyzer 107 may detect struggles by identifying a negative attitude in connection with writing source code. As discussed above, in one embodiment, analyzer 107 may assess a score to the determined attitude, and based on comparison of the score to a threshold value, analyzer 107 makes the determination as to whether the software developer is experiencing difficulty in writing the source code.

Furthermore, in one embodiment, as discussed above, SCM 105 includes a collaborative lifecycle management (CLM) tool 108 configured to coordinate software development activities across business and system requirements, design, development, build, test, and delivery. Such activities are analyzed by analyzer 107 to identify the software developer's struggles in writing source code, including analyzing user stories (informal, natural language description of one or more features of a software system), text pertaining to CLM issues via a sentiment analysis tool (e.g., TensiStrength to detect the strength of stress and relaxation expressed in the text) and the CLM issue severity and resolution duration to determine the extent of the software developer's (e.g., user of computing device 101A) struggles in writing source code. In one embodiment, analyzer 107 may assess a score corresponding to the degree of difficulty in writing the source code based on the sentiment expressed by the user. The score may then be compared to a threshold value to determine whether the software developer is experiencing difficulty in writing the source code. Also, in one embodiment, the CLM issue severity and resolution duration may also be used by analyzer 107 to generate a score which is compared to a threshold value to determine whether the software developer is experiencing difficulty in writing the source code. For example, the greater the CLM issue severity and the greater the time in resolving the issue, the greater the score. In one embodiment, if the score exceeds a threshold value, then analyzer 107 may determine that the software developer is experiencing difficulty in writing the source code.

Additionally, analyzer 107 is configured to analyze messages from collaboration applications, such as Sametime® and Slack®, such via a sentiment analysis tool (e.g., TensiStrength to detect the strength of stress and relaxation expressed in the text). As discussed above, in one embodiment, analyzer 107 may assess a score to the determined attitude, and based on comparison of the score to a threshold value, analyzer 107 makes the determination as to whether the software developer is experiencing difficulty in writing the source code.

Furthermore, in one embodiment, analyzer 107 detects the features from the integrated development environment (IDE), which is a software application used by the software developer, such as on the software developer's computing device (e.g., computing device 101), that provides comprehensive facilities to computer programmers for software development. An IDE normally consists of at least a source code editor, build automation tools, and a debugger. By analyzing such features, such as the number of edits and duration spent on each file as well as the number of build-unit test-edit cycles performed for changes, analyzer 107 may determine if the user (e.g., software developer) of computing device 101 is experiencing source code development difficulties. For example, if the number of edits on a file exceeds a threshold number or the duration of time spent on a file exceeds a threshold amount of time, then analyzer 107 may determine that the user is experiencing source code development difficulties in connection with the source code the user is currently creating. In another example, if the number of build-unit test-edit cycles performed for changes exceeds a threshold number of times, then analyzer 107 may determine that the user is experiencing source code development difficulties in connection with the source code the user is currently creating.

Additionally, in one embodiment, analyzer 107 monitors physiological information from various sources, such as smart wearables 110 and web cameras 112 which is used to detect source code development difficulties as discussed above.

Furthermore, in one embodiment, analyzer 107 monitors online activity of the user, such as the websites visited. Such information may be used to detect source code development difficulties, such as the user visiting websites directed to assisting software developers in writing the source code. In connection with monitoring online activity of the user, an IDE-webpage segment relationship graph may be generated by analyzer 107 which shows the relationship between the IDE features discussed above and the websites visited by the user. Such a graph may be used by analyzer 107 to provide further confidence in determining whether the user is experiencing difficulty in writing source code.

In one embodiment, "struggle" analysis (analysis to determine whether the user is experiencing difficulty in writing source code) is task driven. Each task is assumed to have a time deadline (for instance, an issue in CLM 108 is assigned a severity and resolution deadline). In one embodiment, struggle analysis is run periodically to estimate a score (this score, as well as the scores discussed above, are also referred to herein as the "struggle score") includes computing a remaining time for the task and then computing the gradient of the features mind during labeling (discussed further below).

If the gradient is positive for edits, build-test cycles, typing, stress estimates, etc., with decreasing remaining task time, then such an indication indicates struggle. In one embodiment, the magnitude is the normalized ratio of gradient value and remaining time.

In one embodiment, the struggle points are localized. For example, every IDE event, such as file open, edit, close, build, etc. is timestamped and logged, such as by using plugins.

In one embodiment, localization is through sensor activity. For every sensor activity phase, the subset of files in the IDE that were active and inactive are matched. For example, in the "sitting and typing phase," the list of files open and the list of files edited are obtained. Furthermore, in another example, those files that were edited when the software developer's heart rate or breathing increased could be tagged.

In one embodiment, localization is through web activity. In one embodiment, a web-IDE graph is created by segmenting the webpage and source code text into fixed segments. The source code segment is assigned to a webpage segment if there is non-zero label similarity. The web segments may be clustered according to their source code segment identifier and similarity score using clustering methods, such as mean shift. In one embodiment, the web segments are merged within the same cluster. This refined graph of [web-segment, code-segment] may be weighted by the normalized cost vector of time difference and label similarity. The relationship strength score is then the magnitude of this vector.

The Web-IDE relationship graph may then be used to compute the most likely (from the relationship strength score which is filtered by a threshold value) set of files that might be related to the web search during the last period.

In one embodiment, localization is through CLM issues. For example, the issue labels in the CLM 108 issue tracker are matched with the source file labels. The most likely set of files are selected based on a threshold on the similarity of the labels.

In one embodiment, the source code lines are marked with a normalized struggle score, such as a cost vector of scores (similarity, sensor gradients, etc.). If a file is just open but no editing is performed, all the source code lines have the same score. In one embodiment, each line of source code is also tagged with labels from the mining labels phase.

In one embodiment, the file sets from localization through sensor activity, through web activity and through CLM issues, are combined. For instance, if the intersection of these three sets is null, then the top-K of each set of files is selected, where K is a positive integer number. This is referred to herein as the "predicted-file-set."

Furthermore, in one embodiment, the thresholds discussed in localization through sensor activity, through web activity and through CLM issues, may be adapted by reinforcement learning. Learning from feedback may be inferred by marking the files ("marked-file-set") which get injected with refactored code (discussed further below). The learning weight is tuned by taking the intersection between the marked-file-set and the predicted-file-set.

In step 302, a determination is made by analyzer 107 as to whether source code development difficulties were detected.

If analyzer 107 did not detect any source code development difficulties, then analyzer 107 continues to monitor various sources for source code development difficulties in step 301.

If, however, analyzer 107 detected source code development difficulties, then, in step 303, analyzer 107 labels the source of the source code development difficulties (e.g., social media post) with a tag indicating a finding of a source code development difficulty to assist in identifying future source code development difficulties.

In one embodiment, a score ("struggle score") may be associated with the tag, where the tag, struggle score and associated source code snippet (source code snippet the user is having difficulty in writing) are stored in a file. In one embodiment, such information, such as the tags, as well as the files discussed above, are stored in repository 109.

In one embodiment, tags are generated by analyzing the data from the monitored sources for source code development difficulties (e.g., CLM data, SCM data, images taken by web camera 112, data from web and IDE plugins), using a text sentiment tagger (e.g., SentiStrength) or an image sentiment tagger (e.g., Google® image sentiment analyzer).

In another embodiment, tags are generated based on sentiment and/or parts of speech analysis, where descriptive terms directed to a negative sentiment, including certain parts of speech, such as nouns, are tagged.

In one embodiment, tags are generated using a word-finding query engine (e.g., Datamuse API), where such words match a given set of constraints and that are likely in a given context.

In another embodiment, physiological parameters from smart wearables 110, such as heart rate, etc. are tagged.

In one embodiment, the tags discussed above are stored in repository 109. In one embodiment, the tags stored in repository 109 are associated with confidence weights establishing how confident the tags accurately capture the source code development difficulties. In one embodiment, confidence weights are established based on probabilities of tags accurately capturing the source code development difficulties, which are based on previously feedback from the user.

In one embodiment, tags (along with confidence weights) may be exchanged between software developers with a similarity score above a threshold value. In one embodiment, the context vectors for multiple software developers are computed. Such context vectors are based on the source code currently being written by the software code developers. Based on comparing such context vectors, a similarity score is generated corresponding to how similar are the context vectors. If the similarity score exceeds a threshold value, then it is determined that the software developers are attempting to create similar source code. As a result, tags generated for each software developer are exchanged between them.

In step 304, analyzer 107 stores the tags in repository 109 to be used to discover future tags.

In step 305, analyzer 107 identifies the source code associated with source code development difficulties from the monitored sources via dependency analysis of source code and work item artifacts.

In one embodiment, analyzer 107 creates a mapping between the work-times in the CLM 108 and the source code in SCM 105. Such a mapping may provide analyzer 107 with the ability to predict, given a set/sequence of keywords identified within work-item description, what are the source code artifacts (files/classes) that need to be changed.

Furthermore, in one embodiment, a dependency graph of the inter-artifact (each artifact is a node) dependencies are extracted to create a dependency graph. In one embodiment, the incoming edges indicate dependencies. For example, File A depends on File B implies A→B. Furthermore, in one embodiment, the outgoing edges indicate contributions. Each node in the dependency graph maintains two counters: one (counter-contrib) to indicate the number of times it occurs as a dependency to other struggling nodes and the other (counter-dep) to indicate the number of times it is impacted by the struggle encountered by a contributing node.

In one embodiment, the dependency graph is parsed for every node to infer struggle. All possible incoming and outgoing paths for a given struggling node are listed. In one embodiment, a struggling node is marked using the direct struggle analysis discussed previously. In one embodiment, all counter-contrib nodes appearing in incoming paths to a struggling node are incremented and all counter-dep nodes appearing in outgoing paths from a struggling node are incremented.

The nodes may then be sorted in decreasing order of counter-dep to indicate the nodes which are most affected by the developer's struggle. Another ranked list sorted decreasingly in terms of counter-contrib indicates the nodes that need to be developed first so as to resolve struggle issues in down-stream nodes.

In step 306, analyzer 107 labels the source code (source code snippet) which is the source of the detected source code development difficulty with a tag ("struggle tag"), indicating such difficulties as well as the category of source code being developed (e.g., handles username/password login, performs password validation and stores validation rules for specified tenant). In one embodiment, such tags are determined based on natural language processing identifying key programing terms or comments that indicate that category of source code being developed.

In step 307, analyzer 107 generates a struggle score for the struggles experienced by the software developer indicating a degree of the struggle experienced by the software developer in writing the source code as discussed above.

In step 308, analyzer 107 annotates the source code snippet (the labeled source code snippet of step 306 associated with the struggles experienced by the source code developer) with the struggle score. In one embodiment, the source code snippet annotated with the struggle score (along with other annotated source code snippets) is stored in a repository, such as repository 109.

In step 309, analyzer 107 ranks the annotated source code snippets (e.g., annotated source code snippets stored in repository 109) with the struggle scores, such as those from highest to lowest struggle scores.

In step 310, analyzer 107 stores the ranked annotated source code snippets with struggle scores in repository 109.

Those that are highly ranked (e.g., ranked in the top three) and/or with a struggle score above a threshold value will be selected by analyzer 107 to have its software developer receive proposed reusable code snippets to assist the software developer in writing his/her source code. In connection with assisting the software developer, analyzer 107 mines and identifies source code snippets from software-related documents, source code repositories, and source code snippets publicly available on the Internet as discussed below in connection with FIG. 4.

Referring to FIG. 4, FIG. 4 is a flowchart of a method 400 for populating a repository of tags associated with source code snippets available to be reused in accordance with an embodiment of the present invention.

Referring to FIG. 4, in conjunction with FIGS. 1-3, in step 401, analyzer 107 mines and identifies source code snippets from software-related documents, source code repositories, and source code snippets publicly available on the Internet. For example, analyzer 107 mines and identifies source code snippets from developer communications, research papers, code repositories and/or software-related documents (e.g., developer blog posts, bug reports, API documentation, mailing lists, code reviews, and question & answer forums) using natural language processing. For example, source code snippets may be identified in software-related documents based on identifying keywords, such as "code," "snippet," and "software."

In step 402, analyzer 107 labels the identified source code snippets with tags that indicate a category of the source code. For example, the category of the source code snippet may correspond to the functionality of the source code module being developed by the software developer (e.g., handles username/password login, performs password validation and stores validation rules for specified tenant). In one embodiment, such tags are determined based on natural language processing identifying key programming terms or comments that indicate that category of source code being developed.

In step 403, analyzer 107 stores the tags (along with the associated source code snippets) in repository 109.

Certain source code snippets associated with the tags stored in repository 109 may be selected to be forwarded to the software developer to assist the software developer in overcoming the difficulties experienced by the software developer as discussed below in connection with FIG. 5.

FIG. 5 is a flowchart of a method 500 for providing the software developer a list of relevant source code snippets to be reused by the software developer to overcome the difficulties experienced by the software developer in accordance with an embodiment of the present invention.

Referring to FIG. 5, in conjunction with FIGS. 1-4, in step 501, analyzer 107 identifies the relevant source code snippets to address the software developer's struggles based on matching tags (tag of source code causing software developer difficulty matching a tag associated with previously stored source code to be reused). In one embodiment, "matching," as used herein, refers to an agreement of the category of the source code within a threshold degree of semantic meaning. That is, matching refers to an agreement of the category associated with the tag ("struggle tag") of the source code identified as being the source of the software developer's struggles within a threshold degree of semantic meaning of the category associated with a tag of the identified relevant source code snippets. "Semantic meaning," as used herein, refers to both the literal or connotative meaning of the statement. In one embodiment, semantic meaning is determined by analyzer 107 using natural language processing by inferring the meaning of the category associated with the source code snippet. As a result, analyzer 107 identifies the relevant source code snippets to be reused which correspond to those associated with a category within a threshold degree of semantic meaning as the category associated with the source code snippet causing the software developer difficulty.

In step 502, analyzer 107 ranks (in terms of assisting software developer) the identified relevant source code snippets to be reused by the software developer experiencing difficulty in writing source code based on the degree its associated category matches the semantic meaning of the category of the source code snippet causing the software developer difficulty. In one embodiment, the greater the match, the higher the ranking and the higher the ranking, the more likely such identified source code snippet will assist the software developer in addressing the software developer's current challenges in coding.

In one embodiment, the source code snippets to be reused are ranked based on criticality and relevance.

With respect to criticality, in one embodiment, those code snippets that do not match the file set computed by analyzer 107 are filtered out. For those that match, code analysis is performed by criticality and relevance. For example, impact analysis is performed by identifying the list of files that are related to the changes to the file (and lines of source code) which will be modified due to refactoring (discussed further below). The size of the list in terms of the weighted average of the normalized lines of source code and the number of files is the criticality score. Furthermore, a ranked list of code snippets is produced in decreasing order of the criticality score for each branch (branch of repository), which is sent to all contributors of the branch.

With respect to relevance, in one embodiment, a ranked list of tag similarity scores (similarity scores for the tags of source code causing software developer difficulty and the tags associated with the previously stored source code to be reused) is produced. In one embodiment, the code snippets are ranked in decreasing order of its associated similarity scores, where the ranked list is sent to the contributor. Each line of code in the predicted-set is then tagged with the list of ranked code snippets.

In step 503, analyzer 107 notifies the software developer of the ranked relevant source code snippets by providing a list of the ranked relevant source code snippets, such as the top N ranked, where N is a positive integer number.

In step 504, in response to the software developer identifying one or more source code snippets to be reused by the software developer from the ranked list, analyzer 107 refractors those relevant source code snippets desired to be used by the software code developer.

In one embodiment, analyzer 107 performs generic refactoring. In generic refactoring, discovered code snippets (e.g., discovered from web forums) are cleaned and refined to be reusable using source code curation.

Alternatively, in one embodiment, the software developer may perform manual refactoring, which involves the software developer editing the code snippet after copying it.

Alternatively, in one embodiment, analyzer 107 may perform cross-platform refactoring using language translation tools.

Furthermore, in one embodiment, analyzer 107 may perform in-repository refactoring, such as code refactoring of code snippets used in similar projects (e.g., multiple projects for the same client scenario). Such projects can be identified using the predicted-file-set computed during the struggle analysis discussed above.

In the manner discussed above, the embodiments of the present invention provide a means for identifying and recommending code snippets to be reused by the software developer who is experiencing difficulty in writing the source code to address the software developer's current challenges in coding.

Furthermore, the present invention improves the technology or technical field involving software development. As discussed above, within an organization, software developers store source code in source code repositories, which may include source code developed for multiple projects, including various versions of the same project. For example, a client may be serviced by more than one project. Other times, software developers develop multiple versions of the same project in parallel to address the requirements of different clients. As a result of having multiple source code projects for a single client and having multiple versions of the same source code project to be utilized by multiple clients, there are instances in which source code snippets could have been reused. In addition to instances of source code snippets that could have been reused within an organization, there is a huge availability of source code snippets on the web, such as in web forums. Building and creating software and applications by a software developer is a challenging task. At times, the software developer may struggle in writing such source code for the software and applications, where such struggles may be addressed by reusing relevant source code developed by another software developer. However, despite the fact that there is a large availability of code snippets that could be reused as discussed above, there is not currently a means for discovering relevant reusable code snippets, whether within an organization or on the web, that could address the software developer's challenges in writing the source code.

The present invention improves such technology by monitoring multiple sources (e.g., source code management system, messages in collaborative applications, social media messages, physiological information, etc.) for source code development difficulties. In response to detecting a source code development difficulty, the source code which is the source of the detected source code development difficulty is labeled with a struggle tag, which may indicate a category of the source code. The struggle tag is later stored in a repository. In one embodiment, the source code associated with the detected source code development difficulty is identified via dependency analysis of the source code and work item artifacts. Furthermore, source code snippets from software-related documents, source code repositories, and source code snippets publicly available on the Internet are mined, identified and labeled with tags, which may indicate a category of the source code snippet. Such tags are stored in the repository. Relevant source code snippets are identified to address the software developer's struggles based on matching one or more tags of these stored tags with the struggle tag. The identified relevant source code snippets to be reused are ranked as to which are the best to be utilized by the software developer to address the software developer's struggles in writing source code. The software developer is then notified of the ranked relevant source code snippets. In this manner, relevant source code snippets are identified and recommended to be reused by the software developer to address the software developer's current challenges in coding. In this manner, there is an improvement in the technical field of software development.

The technical solution provided by the present invention cannot be performed in the human mind or by a human using a pen and paper. That is, the technical solution provided by the present invention could not be accomplished in the human mind or by a human using a pen and paper in any reasonable amount of time and with any reasonable expectation of accuracy without the use of a computer.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for identifying and recommending code snippets to be reused by a software developer, the method comprising:
   monitoring sources for source code development difficulties experienced by said software developer;
   detecting a source code development difficulty from said monitored sources for source code development difficulties;
   labeling source code which is a source of said detected source code development difficulty with a struggle tag indicating a category of source code;
   storing said struggle tag in a repository;
   mining and identifying source code snippets from software-related documents, source code repositories, and source code snippets publicly available on the Internet;
   labeling said identified source code snippets with tags that indicate a category of source code;
   storing said tags in said repository;
   identifying relevant source code snippets to address software developer's struggles based on matching one or more tags of said stored tags with said struggle tag;
   ranking said identified relevant source code snippets to be reused by said software developer in terms of assisting said software developer;
   notifying said software developer of said ranked relevant source code snippets by providing a list of said ranked relevant source code snippets; and
   refactoring relevant source code snippets identified from said list of said ranked relevant source code snippets desired to be used by said software developer.

2. The method as recited in claim 1 further comprising:
   labeling a source of said detected source code development difficulty with a second tag indicating a finding of a source code development difficulty to assist in identifying future source code development difficulties.

3. The method as recited in claim 1 further comprising:
   generating a struggle score indicating a degree said software developer struggled in writing source code; and
   annotating said labeled source code with said struggle score.

4. The method as recited in claim 3 further comprising;
   ranking annotated source code snippets with struggle scores.

5. The method as recited in claim 1, wherein said matching comprises an agreement of said category associated with said struggle tag within a threshold degree of semantic meaning of a category associated with said one or more tags of said identified relevant source code snippets.

6. The method as recited in claim 1 further comprising:
   identifying said source code associated with said detected source code development difficulty from said monitored sources via dependency analysis of source code and work item artifacts.

7. A computer program product for identifying and recommending code snippets to be reused by a software developer, the computer program product comprising a computer readable storage medium having program code embodied therewith, the program code comprising the programming instructions for:
   monitoring sources for source code development difficulties experienced by said software developer;
   detecting a source code development difficulty from said monitored sources for source code development difficulties;
   labeling source code which is a source of said detected source code development difficulty with a struggle tag indicating a category of source code;
   storing said struggle tag in a repository;
   mining and identifying source code snippets from software-related documents, source code repositories, and source code snippets publicly available on the Internet;
   labeling said identified source code snippets with tags that indicate a category of source code;
   storing said tags in said repository;
   identifying relevant source code snippets to address software developer's struggles based on matching one or more tags of said stored tags with said struggle tag;
   ranking said identified relevant source code snippets to be reused by said software developer in terms of assisting said software developer;
   notifying said software developer of said ranked relevant source code snippets by providing a list of said ranked relevant source code snippets; and refactoring relevant source code snippets identified from said list of said ranked relevant source code snippets desired to be used by said software developer.

8. The computer program product as recited in claim 7, wherein the program code further comprises the programming instructions for:

labeling a source of said detected source code development difficulty with a second tag indicating a finding of a source code development difficulty to assist in identifying future source code development difficulties.

9. The computer program product as recited in claim 7, wherein the program code further comprises the programming instructions for:

generating a struggle score indicating a degree said software developer struggled in writing source code; and annotating said labeled source code with said struggle score.

10. The computer program product as recited in claim 9, wherein the program code further comprises the programming instructions for:

ranking annotated source code snippets with struggle scores.

11. The computer program product as recited in claim 7, wherein said matching comprises an agreement of said category associated with said struggle tag within a threshold degree of semantic meaning of a category associated with said one or more tags of said identified relevant source code snippets.

12. The computer program product as recited in claim 7, wherein the program code further comprises the programming instructions for:

identifying said source code associated with said detected source code development difficulty from said monitored sources via dependency analysis of source code and work item artifacts.

13. A system, comprising:

a memory for storing a computer program for identifying and recommending code snippets to be reused by a software developer; and a processor connected to said memory, wherein said processor is configured to execute the program instructions of the computer program comprising:

monitoring sources for source code development difficulties experienced by said software developer;

detecting a source code development difficulty from said monitored sources for source code development difficulties;

labeling source code which is a source of said detected source code development difficulty with a struggle tag indicating a category of source code;

storing said struggle tag in a repository;

mining and identifying source code snippets from software-related documents, source code repositories, and source code snippets publicly available on the Internet;

labeling said identified source code snippets with tags that indicate a category of source code;

storing said tags in said repository;

identifying relevant source code snippets to address software developer's struggles based on matching one or more tags of said stored tags with said struggle tag;

ranking said identified relevant source code snippets to be reused by said software developer in terms of assisting said software developer;

notifying said software developer of said ranked relevant source code snippets by providing a list of said ranked relevant source code snippets; and refactoring relevant source code snippets identified from said list of said ranked relevant source code snippets desired to be used by said software developer.

14. The system as recited in claim 13, wherein the program instructions of the computer program further comprise:

labeling a source of said detected source code development difficulty with a second tag indicating a finding of a source code development difficulty to assist in identifying future source code development difficulties.

15. The system as recited in claim 13, wherein the program instructions of the computer program further comprise:

generating a struggle score indicating a degree said software developer struggled in writing source code; and annotating said labeled source code with said struggle score.

16. The system as recited in claim 15, wherein the program instructions of the computer program further comprise:

ranking annotated source code snippets with struggle scores.

17. The system as recited in claim 13, wherein said matching comprises an agreement of said category associated with said struggle tag within a threshold degree of semantic meaning of a category associated with said one or more tags of said identified relevant source code snippets.

* * * * *